United States Patent [19]
Miyoshi et al.

[11] Patent Number: 5,900,438
[45] Date of Patent: May 4, 1999

[54] THERMOSETTING FOAMABLE ORGANOPOLYSILOXANE COMPOSITION AND PROCESS OF CURING THE SAME

[75] Inventors: Kei Miyoshi, Annaka; Hironao Fujiki, Takasaki, both of Japan

[73] Assignee: Shin-Etsu Chemical Co., Ltd., Tokyo, Japan

[21] Appl. No.: 09/130,106

[22] Filed: Aug. 6, 1998

[30] Foreign Application Priority Data

Aug. 8, 1997 [JP] Japan ..................................... 9-259448

[51] Int. Cl.$^6$ ....................................................... C08J 9/02
[52] U.S. Cl. .............................. 521/77; 521/91; 521/134; 521/154; 528/26; 528/31
[58] Field of Search .............................. 521/91, 154, 134, 521/77; 528/26, 31

[56] References Cited

U.S. PATENT DOCUMENTS 5,356,940  10/1994  Giesen ..................... 521/154
5,358,975  10/1994  Anderson ................. 521/154
5,552,448  9/1996   Kobayashi et al. ....... 521/154

*Primary Examiner*—Morton Foelak
*Attorney, Agent, or Firm*—Oblon, Spivak, McClelland, Maier & Neustadt, P.C.

[57] ABSTRACT

There is provided a thermosetting foamable organopolysiloxane composition comprising (A) an organopolysiloxane with a viscosity of 10–100,000 cSt at 25° C. containing a specified amount of an alkenyl group and/or a hydroxyl group, such as a linear dimethylpolysiloxane blocked with a vinyldimethylsiloxy group or a hydroxydimethylsiloxy group at both terminal ends of the molecular chain and not containing an alkenyl group and a hydroxyl group in the diorganosiloxane repeating unit constituting the backbone chain; (B) an organohydrogenpolysiloxane and/or organohydrogensilane each having at least two hydrogen atoms bonded to silicon atoms in the molecule, such as $Me_3SiO—[SiH(Me)O]_{40}—SiMe_3$ wherein Me stands for a methyl group or $C_6H_5SiH_3$; (C) a compound having an active hydrogen group, such as a hydroxyl group-containing compound, such as alcohols; (D) a platinum catalyst; and (E) an acetylenic alcohol compound. This composition has shelf-stability at normal temperature and can form a foam having homogeneous foam cells in the mass production line including a heating step.

8 Claims, No Drawings

THERMOSETTING FOAMABLE ORGANOPOLYSILOXANE COMPOSITION AND PROCESS OF CURING THE SAME

BACKGROUND OF THE INVENTION

1. Field of the Invention

The present invention relates to a useful thermosetting foamable organopolysiloxane composition and a process of curing the same for use in construction materials, automobile materials and others.

2. Description of the Prior Art

Since organopolysiloxane polymers have excellent weather resistance and heat resistance, organopolysiloxane (silicone) foams have come to be widely used in construction materials, automobile materials, etc. in recent years. In the circumstances, how to mix a separately devided foamable material effectively is an important issue, because the foamable material used as raw materials for the construction and automobile materials are normally made up of two or more separate liquid parts (called sides or packs).

According to the conventionally used foamable materials and their curing process, a room temperature-curable foamable material consisting of two or more liquid parts is measured, mixed by hand, injected into a given place, followed by foaming and curing. However, for better conformity with a mass-production line, foamable materials are changing from a room temperature-curable type to a thermosetting type and mixing is changing from manual mixing to mechanical mixing in a blender. The shift of the foamable materials to the thermosetting type contributes to improvement in the speed of a production line and in the product quality because the foamable materials are not influenced by outside air temperature. Furthermore, mechanical mixing is effective in preventing errors in measuring and insufficient mixing.

However, if a conventional room temperature-curable foamable material is used intact as a thermosetting foamable material, a problem arises that foaming and curing start at normal temperature (room temperature) when the liquid parts are mixed and, therefore, it is impossible to secure homogeneous foam cells in the mass production line.

SUMMARY OF THE INVENTION

Accordingly, an object of the present invention is to provide a thermosetting foamable organopolysiloxane composition which has shelf-stability at normal temperature and can form a foam (foamed product) having homogeneous foam cells in the mass production line including a heating step, and to provide a process of curing said composition.

In order to use a room temperature-curable foamable material as a thermosetting foamable material, it is necessary to retard the curing reaction before the material is subjected to the heating step. The present inventors, as a result of studies of various retardants for curing reaction, have found that an acetylene alcohol compound, out of compounds conventionally used as retardants for addition reaction in addition-curable foamable organopolysiloxane compositions (which comprise an alkenyl group-containing organopolysiloxane as a base polymer and an organohydrogensilane and/or organohydrogensiloxane as a crosslinking and foaming agent), brings about a remarkable result even in a small amount. However, since the acetylene alcohol compound has a strong retardation effect, a mere addition of said compound to a conventional room temperature-curable foamable material results in suppressing also an initial foaming to be caused by dehydrogenation for securing homogeneous cells. So, as a result of further studies, the inventors have found that when the reactivity of a hydrogen group (that is, a group containing a hydrogen atom bonded to a silicon atom) is more highly activated either by changing a type having a hydrogen group at the side chain (that is, this type is comprised of a $SiH(R^2)O_{2/2}$ unit wherein $R^2$ has the same meaning as that of the general formula (2) mentioned later, the same being applied in this paragraph) generally used in an organohydrogensilane and/or organohydrogensiloxane, which have hitherto been used as a crosslinking and foaming agent in addition-curable foamable compositions, to a type having a hydrogen group at the terminal end (that is, this type is comprised of a $SiH(R^2)_2O_{1/2}$ unit) or a type having a hydrogen group at both of the terminal end and the side chain (that is, this type is comprised of a $SiH(R^2)O_{2/2}$ unit and a $SiH(R^2)_2O_{1/2}$ unit), or by using said type having a hydrogen group at the terminal end or said type having a hydrogen group at both of the terminal end and the side chain together with the conventional type having a hydrogen group at the side chain, an initial fine foaming sufficient to secure homogeneous foam cells even in compositions using an acetylene alcohol compound, which exhibits a remarkable effect as a retardant even in a small amount, can be attained. The present invention is based on these findings.

Thus, the thermosetting foamable organopolysiloxane composition of the present invention comprises:

(A) an organopolysiloxane represented by the general formula (1):

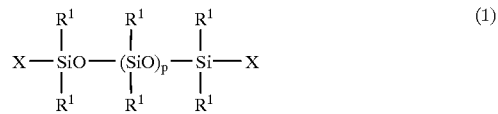

wherein $R^1$ and X are each selected from the group consisting of alkyl groups of 1 to 8 carbon atoms, aryl groups of 6 to 10 carbon atoms, aralkyl groups of 7 to 10 carbon atoms, alkenyl groups of 2 to 8 carbon atoms, a hydroxyl group and substituted groups in which at least a part of the hydrogen atoms bonded to the carbon atoms of these hydrocarbon groups have been substituted with a halogen atom, provided that at least one group among the total of the entire $R^1$ groups and X groups is an alkenyl group or a hydroxyl group, and p is a positive integer so as to give a viscosity of 100 to 100,000 cSt at 25° C.; and containing 0.01 to 5 mol % of alkenyl groups, hydroxyl groups or a mixture thereof in the molecule based on the total amount of the entire $R^1$ groups and X groups in the molecule;

(B) at least one organohydrogensilicon compound having at least two hydrogen atoms bonded to silicon atoms in the molecule selected from the group consisting of an organohydrogenpolysiloxane represented by the general formula(2):

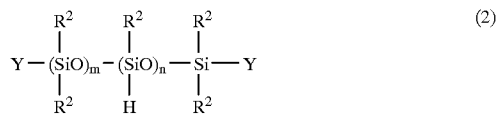

wherein $R^2$ is selected from the group consisting of alkyl groups of 1 to 8 carbon atoms, aryl groups of 6 to 10 carbon atoms, aralkyl groups of 7 to 10 carbon atoms and substituted groups in which at least a part of the hydrogen atoms bonded to the carbon atoms of these groups have been substituted with halogen atoms, and Y is selected from the group consisting of alkyl groups of 1 to 8 carbon atoms, aryl groups of 6 to 10 carbon atoms, aralkyl groups of 7 to 10 carbon atoms, substituted groups in which at least a part of the hydrogen atoms bonded to the carbon atoms of these groups have been substituted with halogen atoms, and a hydrogen atom, and m and n are each zero or positive integers such that m+n satisfies $1 \leq m+n \leq 500$; and an organohydrogensilane represented by the general formula (3):

$$R^2{}_{4-a}SiH_a \qquad (3)$$

wherein $R^2$ is as defined in respect of the general formula (2) above and a is 2 or 3; in component (B), at least 10 mole % based on the total amount of the group Y in the general formula (2) and the hydrogen atoms bonded to a silicon atom in the general formula (3) being hydrogen atoms;

(C) a compound having an active hydrogen group;

(D) a platinum catalyst; and (E) an acetylenic alcohol compound.

Further, the process of curing the aforementioned composition according to the present invention comprises mechanically homogeneously mixing said composition and heating at 40° C. or more to foam and cure the composition.

The thermosetting foamable organopolysiloxane composition of the present invention has shelf-stability at normal temperature and can form a foam having homogeneous foam cells in the mass production line including a heating step.

DESCRIPTION OF THE PREFERRED EMBODIMENTS

Each of the components used in the composition of the present invention will be described in detail below.

Component (A)

Organopolysiloxane

The component (A) is used as a base polymer and represented by said general formula (1).

In the general formula (1), $R^1$ and X are each selected from the group consisting of alkyl groups of 1 to 8 carbon atoms, aryl groups of 6 to 10 carbon atoms, aralkyl groups of 7 to 10 carbon atoms, alkenyl groups of 2 to 8 carbon atoms, a hydroxyl group and substituted groups in which at least a part of the hydrogen atoms bonded to the carbon atoms of these groups have been substituted with a halogen atom, provided that at least one group among the total of the entire $R^1$ groups and X groups is an alkenyl group or a hydroxyl group. Preferably, $R^1$ and X each have two or more alkenyl groups or hydroxyl groups in the molecule, particularly alkenyl groups or hydroxyl groups at at least both terminal ends of the molecular chain. $R^1$ and X besides alkenyl groups and hydroxyl groups may be each a group or groups selected singly or in combination of two or more from the above group.

The alkenyl groups and hydroxyl groups in the general formula (1) are functional groups contributory to crosslinking reaction. The alkenyl groups, hydroxyl groups or a mixture thereof may be bonded to any of the silicon atom present at the terminal end of the molecular chain and the silicon atom present in the course of the molecular chain (that is, in the molecular chain besides both terminal ends), or they may be bonded to both of these silicon atoms, provided that they (alkenyl groups, hydroxyl groups or a mixture thereof) should be contained in an amount of 0.01 to 5 mol %, preferably 0.1 to 3 mol %, based on the total amount of the entire $R^1$ groups and X groups in the molecule. The p is a positive integer so as to give a viscosity of 100 to 100,000 cSt, preferably 500 to 50,000 cSt, at 25° C.

The alkyl groups of 1 to 8 carbon atoms include methyl, ethyl, propyl, isopropyl, butyl, isobutyl, tert-butyl, pentyl, neopentyl, hexyl, cyclohexyl, heptyl and octyl groups, and the like. The aryl groups of 6 to 10 carbon atoms include phenyl, tolyl, xylyl, ethylphenyl and naphthyl groups, and the like. The aralkyl groups of 7 to 10 carbon atoms include benzyl, phenylethyl and phenylpropyl groups, and the like. The alkenyl groups of 2 to 8 carbon atoms include vinyl, allyl, propenyl, isopropenyl, butenyl, isobutenyl and hexenyl groups, and the like. The substituted groups in which at least a part of the hydrogen atoms bonded to the carbon atoms of these groups have been substituted with a halogen atom include 3,3,3-trifluoropropyl, chloromethyl and bromoethyl groups, and the like.

Considering availability and cost, X is preferably a vinyl group or a hydroxyl group while $R^1$ is preferably a methyl group, a phenyl group or a 3,3,3-trifluoropropyl group.

The organopolysiloxane includes specifically linear diorganopolysiloxanes, such as a linear dimethylpolysiloxane, blocked with a vinyldimethylsiloxy group or a hydroxydimethylsiloxy group at both terminal ends of the molecular chain and not containing an alkenyl group and a hydroxyl group in the diorganosiloxane repeating unit constituting the backbone chain.

In order to improve the strength of foams, to the component (A) there can be added a resin comprised basically of $R^1{}_3SiO_{1/2}$ ($R^1$ is the same as above) and $SiO_2$, for example, a vinyl group-containing silicone resin, which is soluble in toluene, comprising $(CH_3)_3SiO_{1/2}$, $(CH_2=CH)(CH_3)_2SiO_{1/2}$ and $SiO_2$, the ratio (molar ratio) of the total amount of the $(CH_3)_3SiO_{1/2}$ and $(CH_2=CH)(CH_3)_2SiO_{1/2}$ to the amount of the $SiO_2$ being 0.6 to 1.2; and the like.

Component (B)

Organohydrogensilicon compound

The organohydrogensilicon compound of the component (B) represented by said general formula (2) or (3) is an organohydrogenpolysiloxane and/or organohydrogensilane each containing at least two hydrogen atoms (that is, SiH groups), preferably three or more hydrogen atoms, bonded to silicon atoms in the molecule and is used as a crosslinking and foaming agent for causing crosslinking reaction by reaction with the component (A) and causing dehydrogenation reaction by reaction with the component (C) to foam the composition.

In the general formula (2) or (3), $R^2$ is selected from the group consisting of alkyl groups of 1 to 8 carbon atoms, aryl groups of 6 to 10 carbon atoms, aralkyl groups of 7 to 10 carbon atoms and substituted groups in which at least a part of the hydrogen atoms bonded to the carbon atoms of these groups have been substituted with halogen atoms; and in the general formula (2), Y is selected from the group consisting of alkyl groups of 1 to 8 carbon atoms, aryl groups of 6 to 10 carbon atoms, aralkyl groups of 7 to 10 carbon atoms, substituted groups in which at least a part of the hydrogen atoms bonded to the carbon atoms of these groups have been substituted with halogen atoms, and a hydrogen atom. In the component (B), however, at least 10% (mole %), that is, 10 to 100%, preferably 30 to 100%, and more preferably 50 to 100%, based on the total amount of the group Y in the entire organohydrogenpolysiloxane and the silicon-bonded hydrogen atoms (SiH groups) in the organohydrogensilane should be consisted of hydrogen atoms. Accordingly in case of using only the organohydrogenpolysiloxane represented by the general formula (2) as the component (B), at least 10% (mole %), that is, 10 to 100%, preferably 30 to 100%, and more preferably 50 to 100%, of the group Y in the entire organohydrogenpolysiloxane should be consisted of hydrogen atoms.

Among $R^2$ and Y, specific examples of the alkyl group of 1 to 8 carbon atoms, the aryl group of 6 to 10 carbon atoms, the aralkyl groups of 7 to 10 carbon atoms and the substituted groups in which at least a part of the hydrogen atoms bonded to the carbon atoms of these groups have been substituted with halogen atoms are the same as in the groups besides an alkenyl group exemplified for the $R^1$ and X of the general formula (1). From availability, $R^2$ is preferably a methyl group and a phenyl group while Y besides a hydrogen atom is preferably a methyl group and a phenyl group.

In the general formula (2), m and n are each zero or positive integers such that m+n satisfies the range of $1 \leq m+n \leq 500$, preferably $1 \leq m+n \leq 200$, and more preferably $8 \leq m+n \leq 100$. Specifically, m is an integer of preferably 0 to 200, more preferably 0 to 100, and particularly preferably 0 to about 50 while n is an integer of preferably 1 to 300, more preferably 1 to 200, and particularly preferably about 4 to about 50.

Specific examples of the component (B) include $Me_3SiO—[SiH(Me)O]_{40}—SiMe_3$ wherein Me stands for a methyl group (the same being hereinafter applied), $HSiMe_2O—[SiH(Me)O]_{40}—SiMe_2H$, $HSiMe_2O—(SiMe_2O)_8—SiMe_2H$, $Me_3SiO—[SiH(Me)O]_{20}—(SiMe_2O)_{20}—SiMe_3$, $C_6H_5SiH_3$, $HSiMe_2O—SiMe_2H$ and the like.

They may be used singly or in combination of two or more thereof. However, when a compound having no silicon-atom-bonded hydrogen atoms (that is, SiH groups) at the terminal end, such as an organohydrogenpolysiloxane blocked with a triorganosiloxy group at both terminal ends is used, the compound should be mixed and used with a compound having a SiH group at the terminal end, for example, an organohydrogenpolysiloxane blocked with a diorganohydrogensiloxy group at both terminal ends and/or an organohydrogensilane, such that 10% or more based on the total amount of the entire terminal end groups Y present in the resulting mixture and the SiH groups present in the organohydrogensilane are hydrogen atoms.

The amount of the component (C) used is suitably 1 to 50 parts by weight, particularly 2 to 30 parts by weight, per 100 parts by weight of the component (A).

Component (C)

Compound having an active hydrogen group

The component (C) may be any compound having an active hydrogen group (that is, a compound containing in the molecule a hydrogen atom having an activity which enables dehydrogenation reaction with a SiH group contained in the component (B) in the presence of a platinum catalyst) but should not be a compound deactivating the catalytic activity of a platinum catalyst, the component (D). The component (C) is used as a foaming agent for foaming the composition by causing dehydrogenation reaction by reaction with the component (B), as set forth above.

The component (C) includes a hydroxyl group-containing compound, such as water, alcohols, silanol group-containing compounds and the like. Specific examples of the alcohols include mono-, di- or tri-hydric alcohols of 1 to about 20 carbon atoms, preferably 1 to about 10 carbon atoms, such as methanol, ethanol, n-propanol, isopropanol, butanol, ethylene glycol, diethylene glycol, glycerin and the like. Specific examples of the silanol group-containing compound include organohydroxysilanes such as trimethylsilanol and diphnylsilanediol; organosiloxane oligomers of 2 to about 50 silicon atoms containing a hydroxyl group, such as $HOSiMe_2O—(SiMe_2)_{0-40}—SiMe_2OH$ and $Me_3SiO—[SiMe(OH)]—O—[SiMe(OH)]—O—SiMe_3$; and the like.

They may be used singly or in a combination of two or more thereof. The amount used is suitably 0.1 to 20 parts by weight, particularly 0.2 to 10 parts by weight, per 100 parts by weight of the component (A).

Component (D)

Platinum catalyst

The platinum catalyst of the component (D) comprises chloroplatinic acid or various complexes derived therefrom. The platinum catalyst is exemplified by platinum black; chloroplatinic acid; an alcohol-modified chloroplatinic acid; a complex of chloroplatinic acid with an olefin, an aldehyde, vinylsiloxane, an acetylene alcohol or the like. The amount thereof used is generally 1 ppm or more, for example, 1 to 1,000 ppm, preferably 2 to 500 ppm, in terms of platinum atom, based on the weight of the composition.

Component (E)

Acetylene alcohol compound

The acetylene alcohol compound of the component (E) is used as an retardant so that foaming and curing reaction does not occur during mechanical mixing in a blender.

The retardant is one selected as an optimum retardant for use in the composition of the present invention from among various retardants, which are generally used as a retardant for addition-curing reaction, for example, benzotriazole compounds [Japanese Patent Publication (kokoku) No. 40-25069], acetylene alcohol compounds [Japanese Patent Publication (kokoku) No. 44-31476 corresponding to U.S. Pat. No. 3,445,420], vinyl group-containing polysiloxane compounds [Japanese Patent Publication (kokoku) No. 48-10947 corresponding to U.S. Pat. No. 3,699,073], hydroperoxides [Japanese Patent Publication (kokoku) No. 57-20340 corresponding to U.S. Pat. No. 4,061,609], and amine compounds [Japanese Pre-examination Patent Publication (kokai) No. 63-56563 corresponding to U.S. Pat. Nos. 4,785,066 and 5,004,792]. Specifically, the component (E) includes 3-methyl-1-butyn-3-ol, 3-methyl-1-pentyn-3-ol, ethynylcyclohexanol, 3,5-dimethyl-1-hexyn-3-ol and the like.

They may be used singly or in a combination of two or more thereof. The amount thereof used is suitably 0.001 to 20 parts by weight per 100 parts by weight of the component (A).

Additives

In the composition of the present invention, a variety of additives can be used together in addition to the above components (A) to (E). For example, a filler can be used in order to give mechanical strength to a cured product. Examples of the filler include calcined fumed silica, precipitated silica, pulverized crystalline silica, colloidal calcium carbonate, precipitated calcium carbonate, heavy calcium carbonate, acetylene black, furnace carbon, titan dioxide, metal oxides, a metal oxide surface-treated with a silane compound or a siloxane compound, and the like. The amount of the filler used is suitably 0 to 300 parts by weight per 100 parts by weight of the component (A).

Besides, there can be added additives conventionally known in the art, such as thixotropy improvers, adhesive improvers, silicone oils as a plasticizer, and the like, as far as the object of the present invention is not hindered.

EXAMPLES

The present invention will be described in more detail with reference to Examples and Comparative Example. In these examples, all parts are parts by weight and Me stands for a methyl group.

Example 1

100 parts of a dimethylpolysiloxane blocked with a vinyldimethylsilyl group at both terminal ends of the molecular chain having a viscosity of 10,000 cSt at 25° C. (content of vinyl groups: 0.19 mole % based on the total amount of the entire methyl groups and vinyl groups bonded to silicon atoms present in the molecule), and 10 parts of a fumed silica surface-treated with dimethyldichlorosilane having a specific surface area of 200 m² were homogeneously mixed to prepare a base.

100 ppm (in terms of the weight of platinum atom) of a siloxane-modified platinum catalyst derived from chloroplatinic acid, and 0.5 part of isopropylalcohol were added to 100 parts of the base and homogeneously mixed and stirred to obtain an A side.

Then, 0.1 part of ethynylcyclohexanol, and 10 parts of a methylhydrogenpolysiloxane represented by the average compositional formula: $HSiMe_2O—[SiH(Me)O]_{40}—SiMe_2H$ containing a silicon-atom-bonded hydrogen atom (SiH group) at the terminal end and the side chain were added to 100 parts of said base to obtain a B side. The mixture of the A side with the B side is a thermosetting foamable organopolysiloxane composition.

Example 2

An A side was prepared which was the same as in Example 1.

Then, 0.1 part of ethynylcyclohexanol, 8 parts of a methylhydrogenpolysiloxane represented by the same average compositional formula as in Example 1 containing a SiH group at the terminal end and the side chain, and 2 parts of a methylhydrogenpolysiloxane represented by the average compositional formula: $HSiMe_2O—(SiMe_2O)_8—SiMe_2H$ containing a SiH group at both terminal ends were added to 100 parts of the base prepared in Example 1 to obtain a B side.

Example 3

An A side was prepared which was the same as in Example 1.

Then, 0.1 part of ethynylcyclohexanol, 8 parts of a methylhydrogenpolysiloxane represented by the average compositional formula: $Me_3SiO—[SiH(Me)O]_{40}—SiMe_3$ containing a SiH group at the side chain, and 2 parts of a methylhydrogenpolysiloxane represented by the average compositional formula: $HSiMe_2O—SiMe_2H$ containing a SiH group at both terminal ends were added to 100 parts of the base prepared in Example 1 to obtain a B side. In the mixture of these methylhydrogenpolysiloxanes, the molar ratio of $HSi(Me)_2O_{1/2}$ unit to $Me_3SiO_{1/2}$ unit which are terminal end groups is 83:17.

Comparative Example 1

An A side was prepared which was the same as in Example 1.

Then, 0.1 part of ethynylcyclohexanol, and 10 parts of the same methylhydrogenpolysiloxane represented by the average compositional formula: $Me_3SiO—[SiH(Me)O]_{40}—SiMe_3$ containing a SiH group at the side chain as used in Example 3 were added to 100 parts of the base prepared in Example 1 to obtain a B side.

Test method

The A side and the B side obtained in each of Examples were employed in an equivalent amount (by weight) to prepare a sample mixed by manual mixing and a sample mixed by mechanical mixing in a static blender. Each of the samples was placed in a predetermined amount on an aluminum petri dish and was left to stand in a dryer maintained at 110° C. for 20 minutes in order to foam and cure, followed by evaluating the state (homogeneity and size) of the foam cells. The result is shown in Table 1.

TABLE 1

|  | Example 1 | Example 2 | Example 3 | Comp. Ex. 1 |
| --- | --- | --- | --- | --- |
| Manual mixing | Homogeneous Less than 1 mm | Homogeneous Less than 1 mm | Homogeneous Less than 1 mm | Homogeneous Less than 1 mm |
| Mechanical mixing | Homogeneous Less than 1 mm | Homogeneous Less than 1 mm | Homogeneous Less than 1 mm | Heterogeneous Partially more than 1 mm |

As seen from Table 1, the thermosetting foamable organopolysiloxane compositions containing, as a foaming and crosslinking agent, an organohydrogenpolysiloxane having a SiH group at the terminal end and containing, as a retardant, an acetylene alcohol compound has shelf-stability at normal temperature and can form a foam having homogeneous foam cells by a heating step.

What is claimed is:

1. A thermosetting foamable organopolysiloxane composition comprising:

(A) an organopolysiloxane represented by the general formula (1):

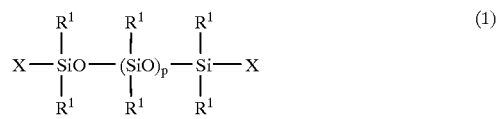

wherein $R^1$ and X are each selected from the group consisting of alkyl groups of 1 to 8 carbon atoms, aryl groups of 6 to 10 carbon atoms, aralkyl groups of 7 to 10 carbon atoms, alkenyl groups of 2 to 8 carbon atoms, a hydroxyl group and substituted groups in which at least a part of the hydrogen atoms bonded to the carbon atoms of the above-mentioned hydrocarbon groups have been substituted with a halogen atom, provided that at least one group among the total of the entire $R^1$ groups and X groups is an alkenyl group or a hydroxyl group, and p is a positive integer so as to give a viscosity of 100 to 100,000 cSt at 25° C.; and containing 0.01 to 5 mol % of alkenyl groups, hydroxyl groups or a mixture thereof in the molecule based on the total amount of the entire $R^1$ groups and X groups in the molecule;

(B) at least one organohydrogensilicon compound having at least two hydrogen atoms bonded to silicon atoms in the molecule selected from the group consisting of an organohydrogenpolysiloxane represented by the general formula(2):

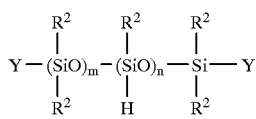

wherein $R^2$ is selected from the group consisting of alkyl groups of 1 to 8 carbon atoms, aryl groups of 6 to 10 carbon atoms, aralkyl groups of 7 to 10 carbon atoms and substituted groups in which at least a part of the hydrogen atoms bonded to the carbon atoms of these groups have been substituted with halogen atoms, and Y is selected from the group consisting of alkyl groups of 1 to 8 carbon atoms, aryl groups of 6 to 10 carbon atoms, aralkyl groups of 7 to 10 carbon atoms, substituted groups in which at least a part of the hydrogen atoms bonded to the carbon atoms of these groups have been substituted with halogen atoms, and a hydrogen atom, and m and n are each zero or positive integers such that m+n satisfies $1 \leq m+n \leq 500$; and an organohydrogensilane represented by the general formula (3):

wherein $R^2$ is as defined above and a is 2 or 3; in component (B), at least 10 mole % based on the total amount of the group Y in the general formula (2) and the hydrogen atoms bonded to a silicon atom in the general formula (3) being hydrogen atoms;

(C) a compound having an active hydrogen group;

(D) a platinum catalyst; and (E) an acetylenic alcohol compound.

2. The composition of claim 1, wherein the organopolysiloxane of component (A) has two or more alkenyl groups or hydroxyl groups.

3. The composition of claim 1, wherein in the general formula (1), X is a vinyl group or a hydroxyl group and $R^1$ is a methyl group, a phenyl group or a 3,3,3-trifluoropropyl group.

4. The composition of claim 1, wherein in the general formulas (2) and (3), $R^2$ is a methyl group or a phenyl group; and in the general formula (2), Y besides a hydrogen atom is a methyl group or a phenyl group.

5. The composition of claim 1, wherein the organohydrogensilicon compound of component (B) is selected from the group consisting of $Me_3SiO—[SiH(Me)O]_{40}—SiMe_3$, $HSiMe_2O—[SiH(Me)O]_{40}—SiMe_2H$, $HSiMe_2O—(SiMe_2O)_8—SiMe_2H$, $Me_3SiO—[SiH(Me)O]_{20}—(SiMe_2O)_{20}—SiMe_3$, $C_6H_5SiH_3$, and $HSiMe_2O—SiMe_2H$, in which Me stands for a methyl group.

6. The composition of claim 1, wherein the compound having an active hydrogen group of component (C) is a hydroxyl group-containing compound selected from the group consisting of water, alcohols and silanol group-containing compounds.

7. The composition of claim 1, wherein the acetylenic alcohol compound of component (E) is at least one compound selected from the group consisting of 3-methyl-1-butyn-3-ol, 3-methyl-1-pentyn-3-ol, ethynylcyclohexanol and 3,5-dimethyl-1-hexyn-3-ol.

8. The composition of claim 1, wherein the amounts of components (B), (C) and (E) are 1 to 50 parts by weight, 0.1 to 20 parts by weight and 0.001 to 20 parts by weight, respectively, per 100 parts by weight of component (A); and the amount of component (D) is 1 ppm or more, in terms of platinum atom, based on the weight of the composition.

* * * * *